US012625933B2

(12) United States Patent
Gudivada et al.

(10) Patent No.: US 12,625,933 B2
(45) Date of Patent: May 12, 2026

(54) CONTROLLING A DEVICE OPERATIONAL MODE ACCORDING TO AN AUTHENTICATION MODE

(71) Applicant: QUALCOMM Incorporated, San Diego, CA (US)

(72) Inventors: Naga Chandan Babu Gudivada, Hyderabad (IN); Rakesh Pallerla, Hyderabad (IN); Prakash Tiwari, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 458 days.

(21) Appl. No.: 17/816,660

(22) Filed: Aug. 1, 2022

(65) Prior Publication Data

US 2024/0037199 A1 Feb. 1, 2024

(51) Int. Cl.
*G06F 21/32* (2013.01)
*G06F 21/35* (2013.01)

(52) U.S. Cl.
CPC .............. *G06F 21/32* (2013.01); *G06F 21/35* (2013.01)

(58) Field of Classification Search
CPC ................................. G06F 21/32; G06F 21/35
USPC .......................................................... 713/186
See application file for complete search history.

(56) References Cited

U.S. PATENT DOCUMENTS 8,634,808 B1 * 1/2014 Zhong ..................... H04M 1/66
726/28
8,881,268 B2 * 11/2014 Chow ..................... G06F 21/31
726/19

10,764,280 B2 * 9/2020 Kim ..................... H04W 12/065
11,287,942 B2 * 3/2022 Han ....................... H04L 63/105
2006/0156028 A1 7/2006 Aoyama et al.
(Continued)

FOREIGN PATENT DOCUMENTS

KR 20220102043 A * 1/2021 ............. G06F 21/31

OTHER PUBLICATIONS

International Search Report and Written Opinion—PCT/US2023/068231—ISA/EPO—Sep. 29, 2023.

*Primary Examiner* — Samson B Lemma
(74) *Attorney, Agent, or Firm* — QUALCOMM Incorporated

(57) ABSTRACT

This disclosure provides systems, methods and apparatus for controlling a device operational mode. Some examples involve receiving an indication of an authentication attempt, determining an authentication mode corresponding with the authentication attempt and determining a device operational mode corresponding with the authentication mode. Responsive to determining that an authentication process corresponding with the authentication attempt completed successfully, a device operational mode corresponding with the authentication mode may be implemented. Examples of device operational modes include a limited access mode and a distress mode, both of which may involve blocking access to at least one type of device functionality or access to at least one type of data. The distress mode also may involve sending SOS data to one or more other devices. The quick launch mode may cause one or more selected software applications to initialize. Some authentication modes may involve obtaining fingerprint data from a specific combination of digits.

16 Claims, 10 Drawing Sheets

(56)                     References Cited

U.S. PATENT DOCUMENTS

| | | | |
|---|---|---|---|
| 2010/0115607 A1* | 5/2010 | Pratt | G06F 21/32 |
| | | | 726/18 |
| 2014/0086460 A1* | 3/2014 | Bechtel | G06V 40/1353 |
| | | | 382/126 |
| 2015/0319294 A1* | 11/2015 | Sudhir | H04W 12/08 |
| 2015/0365515 A1* | 12/2015 | Chen | H04W 4/80 |
| | | | 455/411 |
| 2016/0063230 A1 | 3/2016 | Alten | |
| 2016/0065572 A1* | 3/2016 | Kim | H04L 63/0861 |
| | | | 726/7 |
| 2016/0188859 A1* | 6/2016 | Lee | G06F 21/32 |
| | | | 726/18 |
| 2016/0189161 A1* | 6/2016 | Eramian | G06Q 20/1085 |
| | | | 705/44 |
| 2017/0063851 A1* | 3/2017 | Kim | H04W 12/065 |
| 2018/0253226 A1* | 9/2018 | Hajimusa | G06F 3/04842 |
| 2020/0089852 A1 | 3/2020 | Manjappa et al. | |
| 2022/0365794 A1* | 11/2022 | Khan | G06F 3/04812 |

* cited by examiner

101

305

Receiving, by a control system, an indication of an authentication attempt

310

Determining, by the control system, an authentication mode corresponding with the authentication attempt

315

Determining, by the control system, a device operational mode corresponding with the authentication mode

300

| AUTHENTICATION MODE | DEVICE OPERATIONAL MODE |
| --- | --- |
| First authentication mode | First operational mode |
| Second authentication mode | Second operational mode |
| Third authentication mode | Third operational mode |
| Fourth authentication mode | Fourth operational mode |

| AUTHENTICATION MODE | DEVICE OPERATIONAL MODE |
| --- | --- |
| First authentication mode | Normal operational mode |
| Second authentication mode | Distress mode |
| Third authentication mode | Limited Access mode |
| Fourth authentication mode | Quick Launch mode |

| AUTHENTICATION MODE | DEVICE OPERATIONAL MODE |
| --- | --- |
| First biometric authentication mode | First operational mode |
| Second biometric authentication mode | Second operational mode |
| Third biometric authentication mode | Third operational mode |
| Fourth biometric authentication mode | Fourth operational mode |

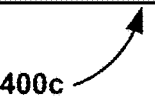

| AUTHENTICATION MODE | DEVICE OPERATIONAL MODE |
| --- | --- |
| First code-based authentication mode | First operational mode |
| Second code-based authentication mode | Second operational mode |
| Third code-based authentication mode | Third operational mode |
| Fourth code-based authentication mode | Fourth operational mode |

| AUTHENTICATION MODE | DEVICE OPERATIONAL MODE |
| --- | --- |
| First code-based authentication mode | First operational mode |
| First biometric authentication mode | Second operational mode |
| Second code-based authentication mode | Third operational mode |
| Second biometric authentication mode | Fourth operational mode |

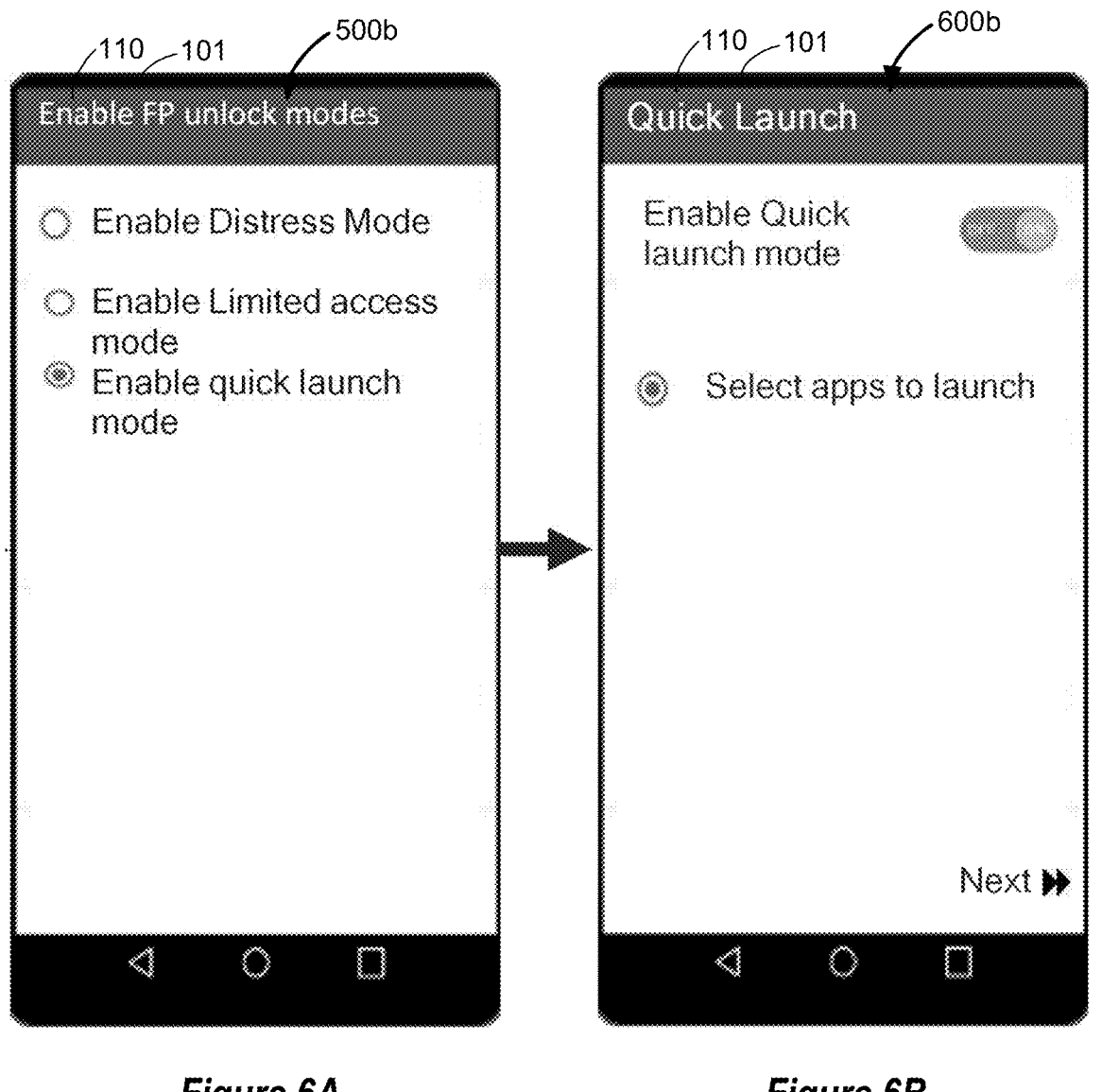
Figure 6A                    Figure 6B

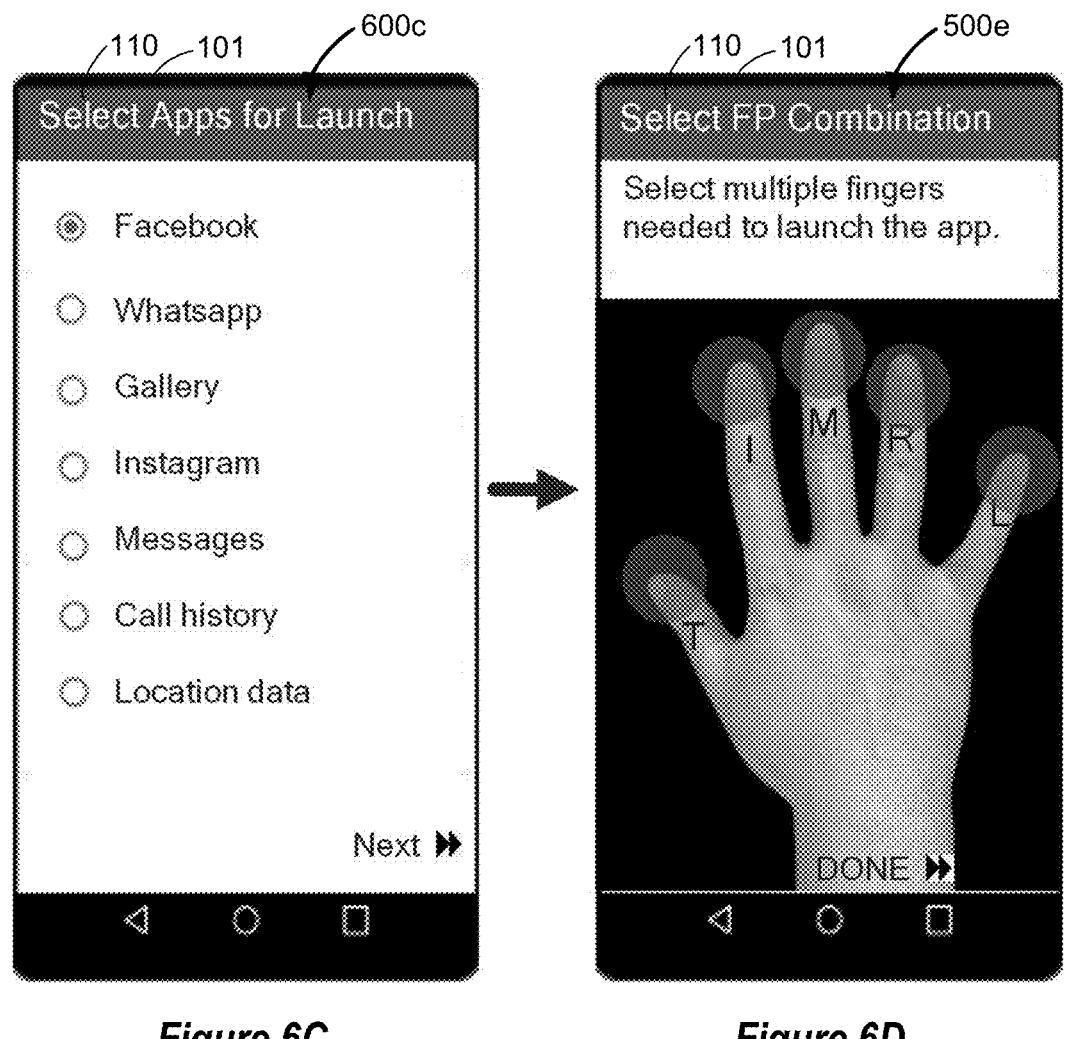
Figure 6C                                  Figure 6D

Providing one or more prompts to select a device operational mode    705

Receiving input corresponding to a selected device operational mode    710

Providing one or more prompts to select functionality corresponding with the device operational mode    715

Receiving input corresponding to selected functionality corresponding with the device operational mode    720

Providing one or more prompts to select the authentication mode    725

Receiving input corresponding to a selected authentication mode    730

Associating the selected device operational mode and the selected functionality with the selected authentication mode    735

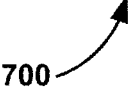

CONTROLLING A DEVICE OPERATIONAL MODE ACCORDING TO AN AUTHENTICATION MODE

TECHNICAL FIELD

This disclosure relates generally to methods, apparatus and systems for controlling access to devices, including but not limited to mobile devices.

DESCRIPTION OF THE RELATED TECHNOLOGY

Mobile devices such as cellular telephones have become nearly ubiquitous features of modern life. Although some existing methods for controlling access to mobile devices provide acceptable performance under some conditions, improved methods and devices would be desirable.

SUMMARY

The systems, methods and devices of the disclosure each have several innovative aspects, no single one of which is solely responsible for the desirable attributes disclosed herein.

One innovative aspect of the subject matter described in this disclosure may be implemented in a method. The method may, for example, be performed by a control system such as one or more of those disclosed herein. In some examples, the method may involve receiving an indication of an authentication attempt and determining an authentication mode corresponding with the authentication attempt. According to some examples, the method may involve determining a device operational mode corresponding with the authentication mode.

In some examples, the method may involve determining that an authentication process corresponding with the authentication attempt completed successfully and invoking the device operational mode corresponding with the authentication mode. According to some examples, the device operational mode may be a limited access mode. In some such examples, the limited access mode may involve blocking access to at least one type of device functionality or access to at least one type of data. According to some examples, the at least one type of data may include one or more of image data, video data, textual data or alphanumeric data. In some examples, the at least one type of device functionality may include functionality of one or more software applications.

According to some examples, the device operational mode may be a distress mode. In some such examples, the distress mode may involve transmitting SOS data to one or more other devices. In some examples, the distress mode may involve blocking access to at least one type of device functionality, access to at least one type of data, or combinations thereof.

In some examples, the device operational mode may be a quick launch mode. In some such examples, the quick launch mode may involve initiating one or more software applications.

According to some examples, the authentication mode may correspond with a fingerprint-based authentication mode. In some such examples, the fingerprint-based authentication mode may correspond with a specific combination of fingerprints from more than one digit.

In some examples, receiving the indication of the authentication attempt may involve receiving one or more touch indications in a fingerprint sensor area. In some examples, receiving the indication of the authentication attempt may involve receiving touch indications corresponding to two or more digits in the fingerprint sensor area.

According to some examples, receiving the indication of the authentication attempt may involve receiving, via a user interface system, a code comprising a plurality of numbers, a plurality of letters, or a combination thereof. In some examples, determining the authentication mode may involve determining a code-based authentication mode. In some examples, determining the device operational mode corresponding with the authentication mode may involve determining whether the code corresponds with a normal operational mode, a distress mode, a limited access mode or a quick launch mode.

Other innovative aspects of the subject matter described in this disclosure may be implemented in an apparatus. According to some examples, the apparatus may be integrated into a mobile device. In some examples, the apparatus may include an interface system and a control system configured for communication with (such as electrically or wirelessly coupled to) interface system. In some examples, the control system may include a memory, whereas in other examples the control system may be configured for communication with a memory that is not part of the control system. The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof.

According to some implementations, the control system may be configured to receive, via the interface system, an indication of an authentication attempt and to determine an authentication mode corresponding with the authentication attempt. In some implementations, the control system may be configured to determine a device operational mode corresponding with the authentication mode.

In some implementations, the apparatus may include an authentication system configured for communication with the control system and configured to perform one or more types of authentication processes. In some such implementations, responsive to determining that an authentication process corresponding with the authentication attempt completed successfully, the control system may be further configured to implement the device operational mode corresponding with the authentication mode.

According to some examples, the device operational mode may be a limited access mode. In some such examples, the limited access mode may involve blocking access to at least one type of device functionality or access to at least one type of data. According to some examples, the at least one type of data may include one or more of image data, video data, textual data or alphanumeric data. In some examples, the at least one type of device functionality may include functionality of one or more software applications.

According to some examples, the device operational mode may be a distress mode. In some such examples, the distress mode may involve transmitting SOS data to one or more other devices. In some examples, the distress mode may involve blocking access to at least one type of device functionality, access to at least one type of data, or combinations thereof.

In some examples, the device operational mode may be a quick launch mode. In some such examples, the quick launch mode may involve initiating one or more software applications.

According to some examples, the authentication mode may correspond with a fingerprint-based authentication mode. In some such examples, the fingerprint-based authentication mode may correspond with a specific combination of fingerprints from more than one digit. In some examples, the device operational mode may correspond with a specific combination of fingerprints from more than one digit.

In some examples, receiving the indication of the authentication attempt may involve receiving one or more touch indications in a fingerprint sensor area. In some examples, receiving the indication of the authentication attempt may involve receiving touch indications corresponding to two or more digits in the fingerprint sensor area.

According to some examples, receiving the indication of the authentication attempt may involve receiving, via a user interface system, a code comprising a plurality of numbers, a plurality of letters, or a combination thereof. In some examples, determining the authentication mode may involve determining a code-based authentication mode. In some examples, determining the device operational mode corresponding with the authentication mode may involve determining whether the code corresponds with a normal operational mode, a distress mode, a limited access mode or a quick launch mode.

Some or all of the operations, functions or methods described herein may be performed by one or more devices according to instructions (such as software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in one or more non-transitory media having software stored thereon. For example, the software may include instructions for controlling one or more devices to perform a method. In some examples, the method may involve establishing a device operational mode corresponding with an authentication mode.

In some examples, the method may involve providing one or more prompts to select the device operational mode and receiving input corresponding to a selected device operational mode. According to some examples, the method may involve providing one or more prompts to select functionality corresponding with the device operational mode and receiving input corresponding to selected functionality corresponding with the device operational mode. In some examples, the method may involve providing one or more prompts to select the authentication mode and receiving input corresponding to a selected authentication mode. According to some examples, the method may involve associating the selected device operational mode and the selected functionality with the selected authentication mode.

According to some examples, associating the selected device operational mode and the selected functionality with the selected authentication mode may involve storing data in a memory corresponding to the selected device operational mode, the selected functionality and the selected authentication mode.

In some examples, the device operational mode may be a limited access mode. In some such examples, the limited access mode may involve blocking access to at least one type of device functionality or access to at least one type of data. According to some examples, the at least one type of data may include one or more of image data, video data, textual data or alphanumeric data. In some examples, the at least one type of device functionality may include functionality of one or more software applications.

According to some examples, the device operational mode may be a distress mode. In some such examples, the distress mode may involve transmitting SOS data to one or more other devices. In some examples, the distress mode may involve blocking access to at least one type of device functionality, access to at least one type of data, or combinations thereof.

In some examples, the device operational mode may be a quick launch mode. In some such examples, the quick launch mode may involve initiating one or more software applications.

According to some examples, the authentication mode may correspond with a fingerprint-based authentication mode. In some such examples, the fingerprint-based authentication mode may correspond with a specific combination of fingerprints from more than one digit. In some examples, the device operational mode may correspond with a specific combination of fingerprints from more than one digit.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIGS. 4A, 4B, 4C, 4D and 4E illustrate tables representing data structures that include authentication modes and corresponding device operational modes.

FIGS. 6A, 6B, 6C and 6D show additional examples of GUIs for establishing device operational modes and corresponding authentication modes.

FIG. 7 is a flow diagram that presents examples of operations according to some disclosed methods.

Like reference numbers and designations in the various drawings indicate like elements.

DETAILED DESCRIPTION

Figure 1:
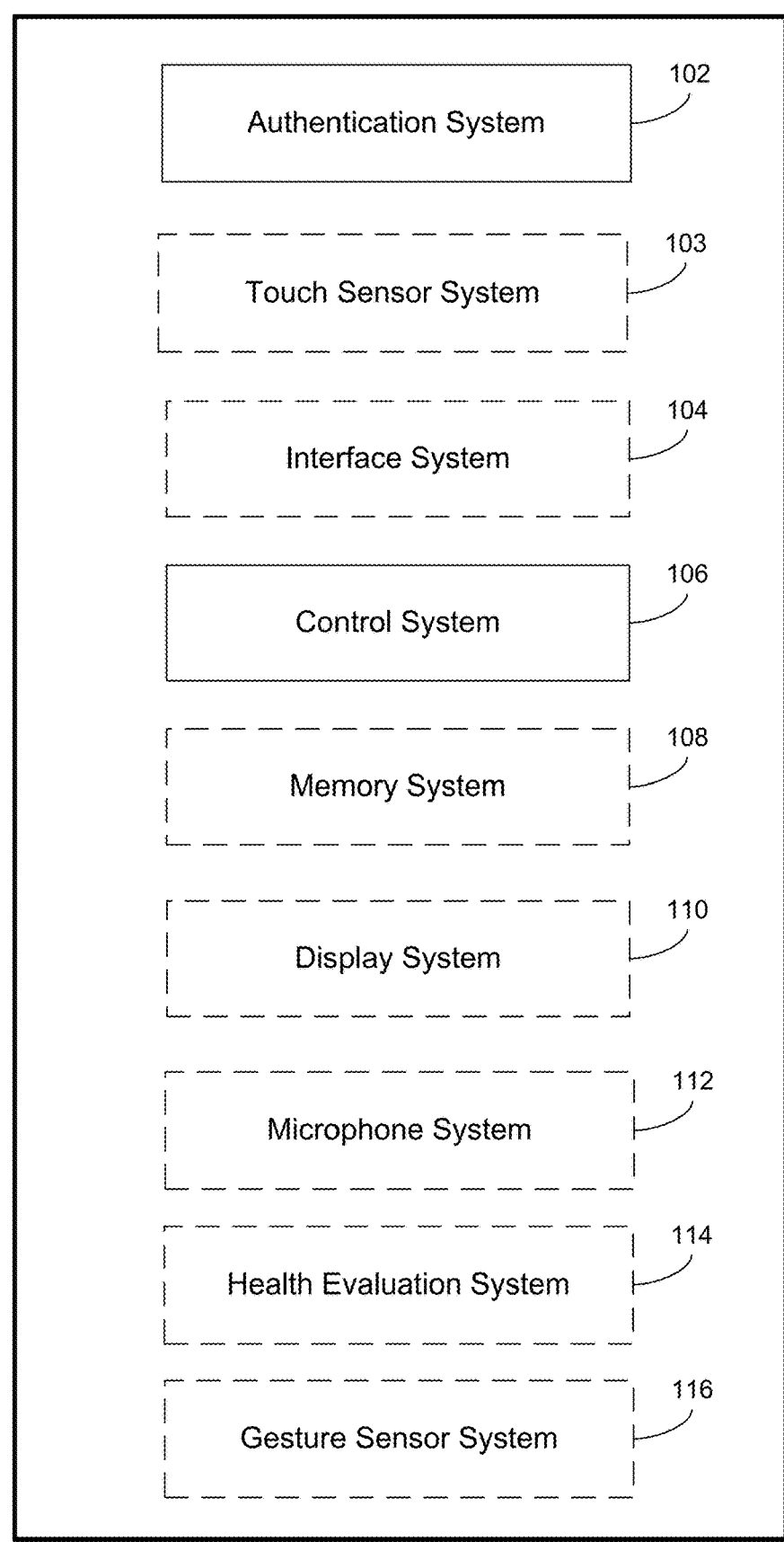
FIG. 1 is a block diagram that presents example components of an apparatus.

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes a biometric system as disclosed herein. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands, patches, etc., Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (such as e-readers), mobile health devices, computer monitors, automobile components, including but not limited to automobile displays (such as odometer and speedometer displays, etc.), cockpit controls or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, steering wheels or other automobile parts, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

It is common for people store important data, some of which may be confidential data, such that the data is accessible via one or more personal devices. Such personal device(s) may include a mobile phone, a laptop, a tablet, a wearable device, etc. In some examples, such data may be stored in a memory system of one or more personal devices. Alternatively, or additionally, such data may be accessible via one or more personal devices but may be stored on one or more other devices, such as on one or more storage devices, one or more servers, etc., of a data center. The important data may, for example, include still image data, video data, personal or professional communications (such as texts, emails, etc.), financial information (such as financial account information, tax information, digital wallet information, cryptocurrency information, one or more Social Security numbers, etc.), other personal or confidential information, or combinations thereof. The important data may pertain to a user of the personal device(s), to a business with which the user is involved, to one or more family members, to one or more other people who have a close relationship with the user of the personal device(s), or combinations thereof.

Accordingly, a person may wish to limit access to at least some such important data. For example, if a device owner shares a device with another person, such as a child or a professional colleague, the device owner may choose to limit access to at least some such important data. The desired limitations to access may, in some instances, depend on the person with whom the device is being shared. Alternatively, or additionally, if the device owner is using the device in the presence of strangers, for example on a bus, train or other public transportation, the device owner may choose to temporarily limit access to at least some such important data, so that such data will not be inadvertently exposed to a stranger's view.

Similarly, a person may wish to block access to at least one type of device functionality in some circumstances, such as when the device is being used by another person. According to some examples, blocking access to at least one type of device functionality may involve blocking access to at least one software application. For example, a person (such as a device owner) may wish to limit access to one or more software applications, so that another person who uses the device will not have access to the software application(s), such as one or more payment apps, one or more digital wallets, etc.

In some circumstances, the device owner may be forced to provide access to the device, for example by a criminal. In such situations, the device owner may wish to appear cooperative, but may nonetheless wish to avoid sharing at least some important information, to avoid providing access to one or more software applications, or combinations thereof.

Some disclosed methods may involve determining and implementing a device operational mode that corresponds with an authentication mode. In some examples, the device operational mode that corresponds with an authentication mode may be a limited access mode that involves blocking access to at least one type of device functionality, access to at least one type of data, or combinations thereof. According to some examples, a device operational mode that corresponds with an authentication mode may be a distress mode. In some such examples, the distress mode also may involve blocking access to at least one type of device functionality, access to at least one type of data, or combinations thereof. In some examples, the distress mode also may involve transmitting SOS data to one or more other devices. Examples of "SOS data" are disclosed herein. Some implementations may provide the option of a "quick launch" mode that corresponds with an authentication mode.

The authentication mode may, in some examples, be one of a plurality of optional authentication modes, each of which corresponds with a different device operational mode. In some examples, the authentication modes may be biometric authentication modes, whereas in other examples the authentication modes may be code-based authentication modes. For example, a fingerprint authentication mode requiring a first combination of digits may correspond with a first device operational mode, a fingerprint authentication mode requiring a second combination of digits may correspond with a second device operational mode and a fingerprint authentication mode requiring a third combination of digits may correspond with a third device operational mode. In another example, a code-based authentication mode requiring a first code may correspond with a first device operational mode, a code-based authentication mode requiring a second code may correspond with a second device operational mode and a code-based authentication mode requiring a third code may correspond with a third device operational mode. In some implementations, one or more device operational modes may correspond with a biometric authentication mode and one or more device operational modes may correspond with a code-based authentication mode.

Particular implementations of the subject matter described in this disclosure may be implemented to realize one or more of the following potential advantages. By allowing only selective access to device functionality and/or data, an authorized device user (such as the owner of the device) can retain relatively higher levels of privacy and data security when another person views or operates the device. If the authorized device user is forced to provide access to the device, for example by a criminal, the device owner may wish to appear cooperative, but may nonetheless wish to avoid sharing at least some important information. The authorized device user may achieve both of these goals by using an authentication mode that triggers a "distress mode" in which access to one or more types of data is blocked, access to one or more types of device functionality (such as one or more software applications) is blocked, or combinations thereof, but in which other types of data and/or device functionality is still accessible. In some examples, the distress mode also may involve transmitting SOS data to one or more other devices. This provides the additional advantage of surreptitiously alerting others and potentially summoning help when the authorized device user may be in danger. If the authorized device user uses an authentication mode that triggers a "quick launch" mode, the authorized device user can cause one or more selected applications to initialize without going through the extra post-authentication steps of, for example, locating an icon corresponding to a desired app and causing the app to initialize.

FIG. 1 is a block diagram that presents example components of an apparatus. In this example, the apparatus 101 includes an authentication system 102 and a control system 106. Some implementations may include a touch sensor system 103, an interface system 104, a memory system 108, a display system 110, a microphone system 112, a health evaluation system 114, a gesture sensor system 116, or combinations thereof.

According to some examples, the authentication system 102 may be, or may include, a code-based authentication system. The code-based authentication system may be configured to receive, via a user interface system, a code comprising a plurality of numbers, a plurality of letters, or a combination thereof, and to determine whether the received code matches an authorized code, such as a code that is established during a user enrollment process, during a pass code or password updating process, etc. In some disclosed examples, there may be two or more authorized codes. According to some examples, each of the authorized codes may correspond with a device operational mode.

In some examples, the authentication system 102 may be, or may include, a biometric authentication system. According to some such examples, the biometric authentication system may include a facial recognition system. Alternatively, or additionally, the authentication system 102 may be, or may include, a voice recognition system. Alternatively, or additionally, the authentication system 102 may include a retinal scanner and a retinal scan recognition system.

Alternatively, or additionally, the authentication system 102 may include a fingerprint sensor system. In some such examples, the authentication system 102 may be, or may include, an ultrasonic fingerprint sensor system. Alternatively, or additionally, in some implementations the authentication system 102 may be, or may include, an optical fingerprint sensor system. In some examples, an ultrasonic version of the authentication system 102 may include an ultrasonic receiver and a separate ultrasonic transmitter. In some such examples, the ultrasonic transmitter may include an ultrasonic plane-wave generator. However, various examples of ultrasonic fingerprint sensor systems are disclosed herein, some of which may include a separate ultrasonic transmitter and some of which may not. For example, in some implementations, the authentication system 102 may include a piezoelectric receiver layer, such as a layer of polyvinylidene fluoride PVDF polymer or a layer of polyvinylidene fluoride-trifluoroethylene (PVDF-TrFE) copolymer. In some implementations, a separate piezoelectric layer may serve as the ultrasonic transmitter. In some implementations, a single piezoelectric layer may serve as both a transmitter and a receiver. The authentication system 102 may, in some examples, include an array of ultrasonic transducer elements, such as an array of piezoelectric micromachined ultrasonic transducers (PMUTs), an array of capacitive micromachined ultrasonic transducers (CMUTs), etc. In some such examples, PMUT elements in a single-layer array of PMUTs or CMUT elements in a single-layer array of CMUTs may be used as ultrasonic transmitters as well as ultrasonic receivers.

Data received from one or more biometric sensors of the authentication system 102 may sometimes be referred to herein as "biometric data." For example, data received from a fingerprint sensor of the authentication system 102 may sometimes be referred to herein as "fingerprint sensor data," "fingerprint image data," etc., although the data will generally be received from the fingerprint sensor system in the form of electrical signals. Accordingly, without additional processing such image data would not necessarily be perceivable by a human being as an image.

The touch sensor system 103 (if present) may be, or may include, a resistive touch sensor system, a surface capacitive touch sensor system, a projected capacitive touch sensor system, a surface acoustic wave touch sensor system, an infrared touch sensor system, or any other suitable type of touch sensor system. In some implementations, the area of the touch sensor system 103 may extend over most or all of a display portion of the display system 110.

The control system 106 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. According to some examples, the control system 106 also may include one or more memory devices, such as one or more random access memory (RAM) devices, read-only memory (ROM) devices, etc. In this example, the control system 106 is configured for communication with, and for controlling, the authentication system 102. In implementations where the apparatus includes a touch sensor system 103, the control system 106 is configured for communication with, and for controlling, the touch sensor system 103. In implementations where the apparatus includes a memory system 108 that is separate from the control system 106, the control system 106 also may be configured for communication with the memory system 108. In implementations where the apparatus includes a microphone system 112, the control system 106 is configured for communication with, and for controlling, the microphone system 112. In implementations where the apparatus includes a health evaluation system 114, the control system 106 is configured for communication with, and for controlling, the health evaluation system 114. According to some examples, the control system 106 may include one or more dedicated components for controlling the authentication system 102, the touch sensor system 103, the memory system 108, the display system 110, the microphone system 112 or the health evaluation system 114. In some implementations, functionality of the control system 106 may be partitioned between one or more controllers or processors, such as between a dedicated sensor controller and an applications processor of a mobile device.

In some examples, the memory system 108 may include one or more memory devices, such as one or more RAM devices, ROM devices, etc. In some implementations, the memory system 108 may include one or more computer-readable media, storage media or storage media. Computer-readable media include both computer storage media and communication media including any medium that may be enabled to transfer a computer program from one place to another. Storage media may be any available media that may be accessed by a computer. In some examples, the memory system 108 may include one or more non-transitory media. By way of example, and not limitation, non-transitory media may include RAM, ROM, electrically erasable program-mable read-only memory (EEPROM), compact disc ROM (CD-ROM) or other optical disk storage, magnetic disk storage or other magnetic storage devices, or any other medium that may be used to store desired program code in the form of instructions or data structures and that may be accessed by a computer.

Some implementations of the apparatus 101 may include an interface system 104. In some examples, the interface system 104 may include a wireless interface system. In some implementations, the interface system 104 may include a user interface system, one or more network interfaces, one or more interfaces between the control system 106 and the authentication system 102, one or more interfaces between the control system 106 and the touch sensor system 103, one or more interfaces between the control system 106 and the memory system 108, one or more interfaces between the control system 106 and the display system 110, one or more interfaces between the control system 106 and the micro-phone system 112, one or more interfaces between the control system 106 and the health evaluation system 114, one or more interfaces between the control system 106 and the gesture sensor system 116, one or more interfaces between the control system 106 and one or more external device interfaces (such as ports or applications processors), or combinations thereof.

The interface system 104 may be configured to provide communication (which may include wired or wireless com-munication, electrical communication, radio communica-tion, etc.) between components of the apparatus 101. In some such examples, the interface system 104 may be configured to provide communication between the control system 106 and the authentication system 102. According to some such examples, the interface system 104 may couple at least a portion of the control system 106 to the authenti-cation system 102 and the interface system 104 may couple at least a portion of the control system 106 to the touch sensor system 103, such as via electrically conducting material (for example, via conductive metal wires or traces). According to some examples, the interface system 104 may be configured to provide communication between the appa-ratus 101 and one or more other devices, such as a device that includes a health evaluation system 114. In some examples, the interface system 104 may be configured to provide communication between the apparatus 101 and a human being. In some such examples, the interface system 104 may include one or more user interfaces. In some examples, the user interface(s) may be provided via the touch sensor system 103, the display system 110, the micro-phone system 112, the gesture sensor system, or combina-tions thereof. According to some examples, the interface system 104 may include a haptic feedback system. The interface system 104 may, in some examples, include one or more network interfaces or one or more external device interfaces (such as one or more universal serial bus (USB) interfaces or a serial peripheral interface (SPI)).

In some examples, the apparatus 101 may include a display system 110 having one or more displays. In some examples, the display system 110 may be, or may include, a light-emitting diode (LED) display, such as an organic light-emitting diode (OLED) display. In some such examples, the display system 110 may include layers, which may be referred to collectively as a "display stack."

In some implementations, the apparatus 101 may include a microphone system 112. The microphone system 112 may include one or more microphones.

According to some implementations, the apparatus 101 may include a health evaluation system 114. The health evaluation system 114 may include one or more types of sensors for health evaluation, such as one or more gyro-scopes, accelerometers, optical sensors, apparatus for mea-suring cardiac functions, apparatus for measuring respira-tory functions, or combinations thereof. The health evaluation system 114 may be configured to provide health condition data to the control system 106 indicating the health of a user of the apparatus 101. In some examples, the health evaluation system 114 may be configured for obtain-ing one or more types of cardiac data, such as heart rate data, blood pressure data, etc. In some such examples, the health condition data may include the cardiac data. According to some examples, the health evaluation system 114 may be configured for obtaining one or more types of respiratory data, such as breath rate data. In some such examples, the health condition data may include the respiratory data. In some examples, the health evaluation system 114 may be configured for obtaining one or more types of blood-related data, such as estimated blood oxygen levels. In some such examples, the health condition data may include the blood-related data. According to some examples, the health evalu-ation system 114 may include an inertial sensor system that is configured for obtaining accelerometer data. Accordingly, in some examples, the health condition data may include the accelerometer data. In some instances, the accelerometer data may indicate a rapid deceleration indicating that the device user has fallen, has been pushed down, has been in a vehicle accident, etc.

In some implementations, the apparatus 101 may include a gesture sensor system 116. The gesture sensor system 116 may be, or may include, an ultrasonic gesture sensor system, an optical gesture sensor system or any other suitable type of gesture sensor system.

The apparatus 101 may be used in a variety of different contexts, some examples of which are disclosed herein. For example, in some implementations a mobile device may include at least a portion of the apparatus 101. In some implementations, a wearable device may include at least a portion of the apparatus 101. The wearable device may, for example, be a bracelet, an armband, a wristband, a ring, a headband or a patch. In some implementations, the control system 106 may reside in more than one device. For example, a portion of the control system 106 may reside in a wearable device and another portion of the control system 106 may reside in another device, such as a mobile device (for example, a smartphone). The interface system 104 also may, in some such examples, reside in more than one device.

Figure 2:
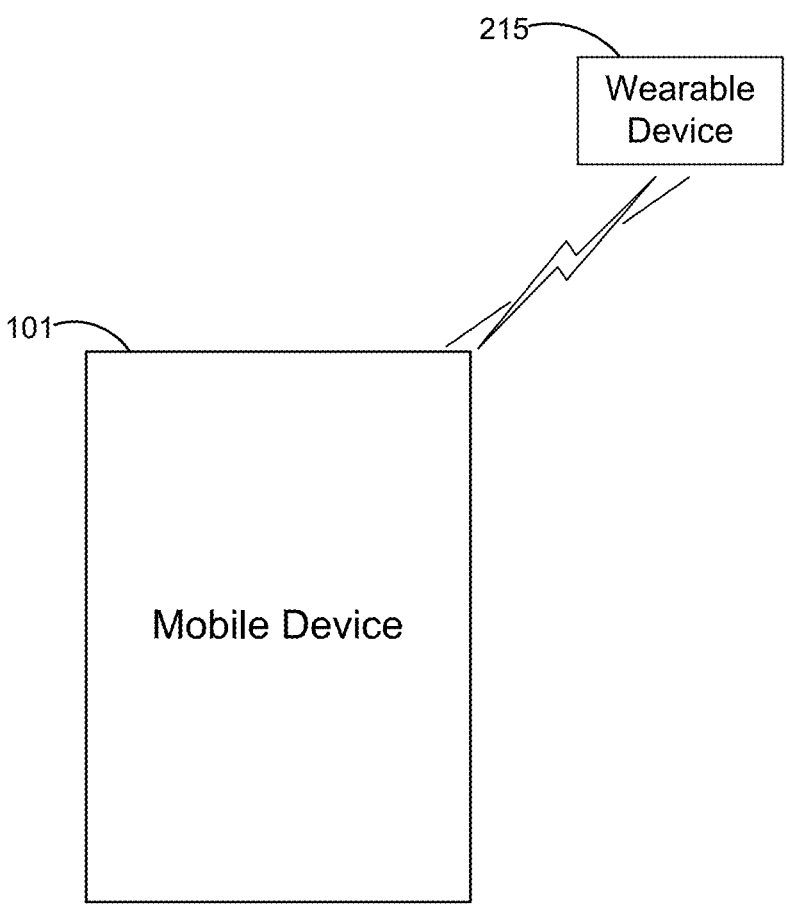
FIG. 2 presents an example of the apparatus of FIG. 1 that is configured for communication with another device.

FIG. 2 presents an example of the apparatus of FIG. 1 that is configured for communication with another device. The numbers, types and arrangements of elements shown in the figures provided herein, including but not limited to FIG. 2, are merely examples. Other examples may include different elements, different arrangements of elements, or combinations thereof.

According to this example, the apparatus 101 is a mobile device, such as a cellular telephone. FIG. 2 also illustrates a wearable device 215 that is configured for wireless communication with the apparatus 101. The wearable device 215 may, for example, be a watch, one or more earbuds, headphones, another accessory device, etc. In this example, the same person is the authorized user for both the apparatus 101 and the wearable device 215.

According to some implementations, the wearable device 215 may include some or all of the elements shown in FIG. 1. In this implementation, the wearable device 215 includes an instance of the health evaluation system 114 that is described with reference to FIG. 1. The health evaluation system 114 of the wearable device 215 is configured for obtaining health condition data corresponding to one or more health conditions of the first authorized user. The health evaluation system 114 may include one or more types of sensors for health evaluation, such as one or more gyroscopes, accelerometers, optical sensors, apparatus for measuring cardiac functions, apparatus for measuring respiratory functions, or combinations thereof. In this example, the wearable device 215 is configured to provide health condition data that is obtained by the health evaluation system 114 to the control system 106 of the apparatus 101.

Figure 3:
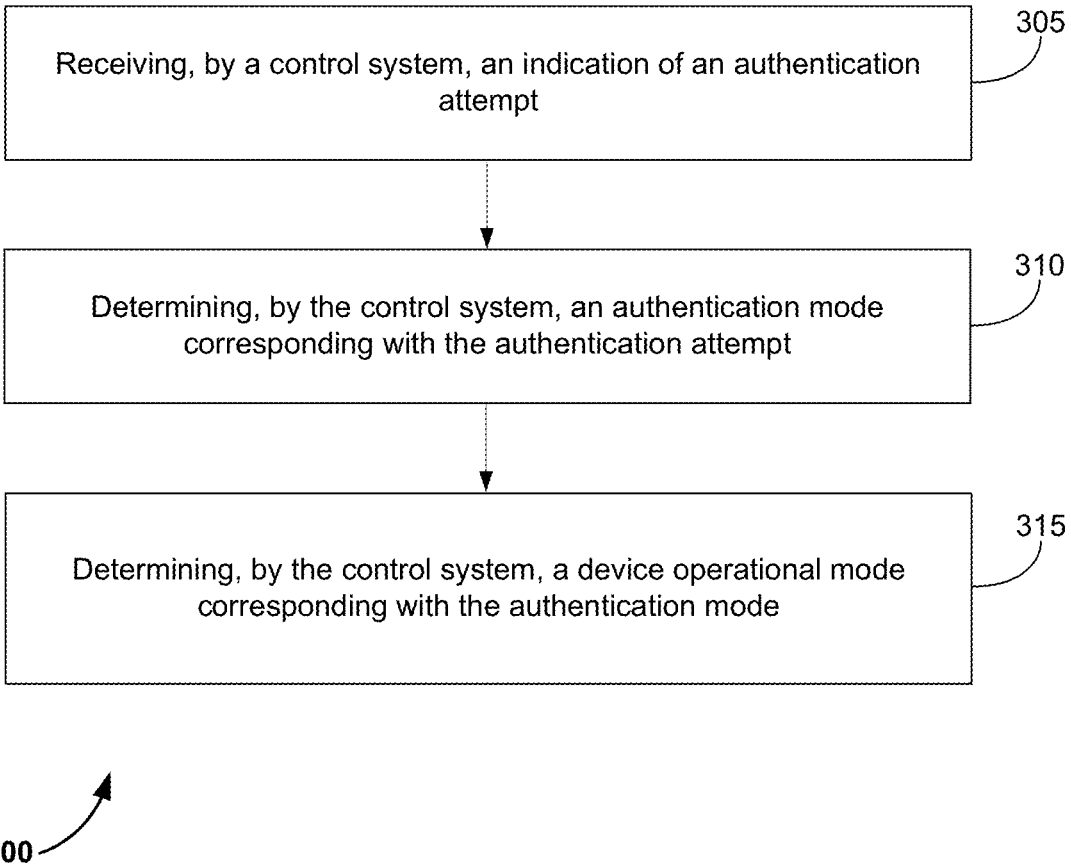
FIG. 3 is a flow diagram that presents examples of operations according to some disclosed methods.

FIG. 3 is a flow diagram that presents examples of operations according to some disclosed methods. The blocks of FIG. 3 may, for example, be performed by the apparatus 101 of FIG. 1, by the apparatus 101 of FIG. 2, or by a similar apparatus. For example, in some instances method 300 may be performed, at least in part, by the control system 106 of FIG. 1. As with other methods disclosed herein, the methods outlined in FIG. 3 may include more or fewer blocks than indicated. Moreover, the blocks of methods disclosed herein are not necessarily performed in the order indicated. In some implementations, one or more blocks may be performed concurrently.

According to this example, method 300 involves controlling a device operational mode. In some examples, the device may be a mobile device, such as a cellular telephone. However, in other examples, the device may be another type of device, such as a tablet, a laptop, an automobile or component thereof, a wearable device, etc.

In this example, block 305 involves receiving, by a control system, an indication of an authentication attempt. The indication of the authentication attempt may vary according to the particular implementation and to particular instances of device usage. For example, in some instances the indication of the authentication attempt may correspond with the receipt of data by an authentication system, such as the authentication system 102. In some instances the data received by the authentication system may be, or may include, biometric data, such as fingerprint data, retinal scan data, etc. In other instances the data received by the authentication system may be, or may include, a plurality of numbers, a plurality of letters, or a combination thereof. Such data may, for example, be received via a user interface system.

According to some examples, receiving the indication of the authentication attempt may involve receiving one or more touch indications. In some such examples, receiving the indication of the authentication attempt may involve receiving one or more touch indications in a fingerprint sensor area. According to some such examples, receiving the indication of the authentication attempt may involve receiving touch indications corresponding to two or more digits in the fingerprint sensor area. In some examples, the indication of the authentication attempt may be received subsequent to an authentication prompt provided by the device.

In this example, block 310 involves determining, by the control system, an authentication mode corresponding with the authentication attempt. For example, block 310 may involve determining whether the authentication mode is a biometric authentication mode or a code-based authentication mode. In some examples, block 310 may involve determining whether the authentication mode is a particular type of biometric authentication mode or a particular type of code-based authentication mode.

According to some examples, the authentication mode may be, or may correspond with, a fingerprint-based authentication mode. In some such examples, block 310 may involve determining whether the fingerprint-based authentication mode is based on features (such as fingerprint minutiae) extracted from fingerprint image data obtained from a single digit or based on features extracted from fingerprint image data obtained from more than one digit. According to some examples, one fingerprint-based authentication mode may correspond to one particular digit, such as a user's right thumb, and another fingerprint-based authentication mode may correspond to another particular digit, such as a user's left middle finger. In some instances, the authentication mode may be, or may correspond with, a specific combination of fingerprints from more than one digit. In some examples, one fingerprint-based authentication mode may correspond to a first combination of digits, such as the user's right index finger and right middle finger, and another fingerprint-based authentication mode may correspond to another combination of digits, such as the user's right thumb and left thumb.

In some examples, block 310 may involve determining whether the authentication mode is a particular type of code-based authentication mode. In some examples, one code-based authentication mode may correspond to a first combination of letters and/or numbers, and another code-based authentication mode may correspond to a second combination of letters and/or numbers.

According to this example, block 315 involves determining, by the control system, a device operational mode corresponding with the authentication mode. In some examples, method 300 may involve determining, by the control system, whether an authentication process corresponding with the authentication attempt completed successfully. According to some such examples, responsive to determining that the authentication process corresponding with the authentication attempt has completed successfully, the control system may be configured to invoke or to implement a device operational mode corresponding with the authentication mode.

In some examples, the device operational mode may be a limited access mode. The limited access mode may involve blocking access to at least one type of device functionality or access to at least one type of data. The at least one type of data may, for example, include image data, video data, textual data, alphanumeric data or combinations thereof. According to some examples, the at least one type of device functionality may include functionality of one or more software applications, such as one or more payment apps, one or more digital wallets, etc.

According to some examples, the device operational mode may be a distress mode. In some such examples, the distress mode may involve blocking access to at least one type of device functionality or access to at least one type of data. Alternatively, or additionally, the distress mode may involve transmitting SOS data to one or more other devices. The SOS data may, for example, indicate an emergency involving an authorized user of the device. In some examples the SOS data may be, or may include, a message indicating that an authorized user of the device has enabled a distress mode. According to some examples, the SOS data may be, or may include, a message indicating that an authorized user of the device is in danger.

In some instances, the SOS data may include health condition data from a health evaluation system. The health evaluation system may be an instance of the health evaluation system 114 that is described herein with reference to FIG. 1. As noted elsewhere herein, the health evaluation system may reside in the same apparatus and/or in another device that is in communication with the device, such as a watch or another wearable device. For example, if the health condition data indicates that an authorized user has an unusually high heart rate or an unusually high respiration rate, the SOS data may include such anomalous health condition data. Similarly, if the health condition data indicates that the authorized user has no pulse or is not breathing, the SOS data may include such anomalous health condition data. In other examples, the SOS data may include health condition data even if the health condition data do not indicate any abnormal health condition of the authorized user. Such examples may provide peace of mind to recipients of the SOS data that the authorized user may be in danger, but is still alive.

According to some implementations, one device operational mode may be a quick launch mode. The quick launch mode may involve automatically initiating one or more software applications responsive to a successful authentication according to a corresponding authentication mode. In some examples, a quick launch mode may be configured to launch an emailing/scheduling app, such as Outlook™, or any other selected software application. In other examples, a quick launch mode may be configured to initiate a communication, such as a telephone call, with a specified person.

It should be apparent from the previous examples that an authentication mode may be one of a plurality of viable authentication modes, each of which may correspond with a different device operational mode. FIGS. 4A, 4B, 4C, 4D and 4E illustrate tables representing data structures that include authentication modes and corresponding device operational modes. FIGS. 4A-4E include tables 400a-400e, respectively. In some examples, data structures corresponding to the tables 400a-400e, or similar data structures, may be stored in memory system that is part of, or accessible by, a control system such as the control system 106 of FIG. 1. In some such examples, data structures corresponding to the tables 400a-400e, or similar data structures, may be stored in the memory system 108, in a memory of the control system 106, or combinations thereof. According to some examples, block 315 of FIG. 3 may involve accessing a data structure corresponding to the tables 400a-400e, or a similar data structure.

In these examples, the tables 400a-400e include four authentication modes and four corresponding device operational modes. As with other disclosed examples, the numbers, types and arrangements of elements shown in FIGS. 4A-4E are merely presented by way of example. Some alternative examples may, for example, include more or fewer authentication modes and device operational modes, different types of authentication modes, different types of device operational modes, or combinations thereof.

In the example shown in FIG. 4A, table 400a includes first through fourth authentication modes and first through fourth corresponding device operational modes. In some examples, the first through fourth authentication modes may be authentication modes that are specifically disclosed herein, whereas in other examples the first through fourth authentication modes may be other authentication modes that would be apparent to one of ordinary skill in the art in view of the present disclosure. Similarly, in some examples the first through fourth device operational modes may be device operational modes that are specifically disclosed herein, whereas in other examples the first through fourth device operational modes may be other device operational modes that would be apparent to one of ordinary skill in the art in view of the present disclosure.

In the example shown in FIG. 4B, table 400b also includes first through fourth authentication modes and first through fourth corresponding device operational modes. However, in this example, the first through fourth corresponding device operational modes are specifically indicated to be a normal operational mode, a distress mode, a limited access mode and a quick launch mode. The distress mode, a limited access mode and quick launch mode may be as disclosed elsewhere herein. The "normal" operational mode may, for example, allow access to all data and device functionality. In some examples, even in a "normal" operational mode, an additional authentication process may be required for access to some types of data and/or for some types of device functionality to be made available.

According to the example shown in FIG. 4C, table 400c also includes first through fourth authentication modes and first through fourth corresponding device operational modes. However, in this example, the first through fourth authentication modes are specifically indicated to be first through fourth biometric authentication modes. In some examples, the first through fourth biometric authentication modes may all be the same general type of biometric authentication modes. According to some such examples, the first through fourth biometric authentication modes may all be fingerprint authentication modes, may all be retinal scan authentication modes, may all be voice recognition authentication modes, etc.

In some examples, a fingerprint authentication mode requiring a first combination of digits may correspond with the first device operational mode, a fingerprint authentication mode requiring a second combination of digits may correspond with the second device operational mode, a fingerprint authentication mode requiring a third combination of digits may correspond with a the third device operational mode and a fingerprint authentication mode requiring a fourth combination of digits may correspond with the fourth device operational mode. According to some such examples, a fingerprint authentication mode requiring a first combination of digits may correspond with a normal operational mode, a fingerprint authentication mode requiring a second combination of digits may correspond with a distress mode, a fingerprint authentication mode requiring a third combination of digits may correspond with a limited access mode and a fingerprint authentication mode requiring a fourth combination of digits may correspond with a quick launch mode.

However, in some examples, the first through fourth biometric authentication modes may not all be the same general type of biometric authentication modes. According to some such examples, the first through fourth biometric authentication modes may include at least two different types of biometric authentication modes, or at least three different types of biometric authentication modes. In some such examples, the first through fourth biometric authentication modes may all be different types of biometric authentication modes.

In the example shown in FIG. 4D, table 400*d* also includes first through fourth authentication modes and first through fourth corresponding device operational modes. However, in this example, first through fourth authentication modes are first through fourth code-based authentication modes requiring first through fourth codes. Here, a first code-based authentication mode requiring a first code corresponds with a first device operational mode, a second code-based authentication mode requiring a second code corresponds with a second device operational mode, a third code-based authentication mode requiring a third code corresponds with a third device operational mode and a fourth code-based authentication mode requiring a fourth code corresponds with a fourth device operational mode. In one such example, the first code-based authentication mode may correspond with a normal operational mode, the second code-based authentication mode may correspond with a distress mode, the third code-based authentication mode may correspond with a limited access mode and the fourth code-based authentication mode may correspond with a quick launch mode.

However, in other examples, a combination of one or more code-based authentication modes and one or more biometric authentication modes may be required to access various device operational modes. In the example shown in FIG. 4E, a first code-based authentication mode corresponds with a first device operational mode, a first biometric authentication mode corresponds with a second device operational mode, a second code-based authentication mode corresponds with a third device operational mode and a second biometric authentication mode corresponds with a fourth device operational mode. Other combinations of code-based and biometric authentication modes, with corresponding device operational modes, are contemplated by the inventors.

FIGS. 5A, 5B, 5C, 5D, 5E and 5F show examples of graphical user interfaces (GUIs) for establishing device operational modes and corresponding authentication modes. The numbers, types and arrangements of elements shown in the figures provided herein, including but not limited to those of FIGS. 5A-5F, are merely examples. Other examples may include different elements, different arrangements of elements, or combinations thereof. For example, the authentication modes referenced in FIGS. 5A-5E are all biometric authentication modes, and are specifically fingerprint authentication modes. In some alternative examples, GUIs for establishing device operational modes and corresponding authentication modes may allow other types of authentication modes to be selected, such as one or more types of alternative authentication modes that are disclosed herein. Alternatively, or additionally, in some implementations audio prompts may be presented instead of, or addition to, textual prompts like those of FIGS. 5A-5E.

In these examples, the apparatus 101 shown in FIGS. 5A-5F is an instance of the apparatus 101 of FIG. 1. According to these examples, the control system 106 (not shown) is controlling the display system 110 to present the GUIs 500*a*-500*e*.

Figures 5A, 5B, 5C:
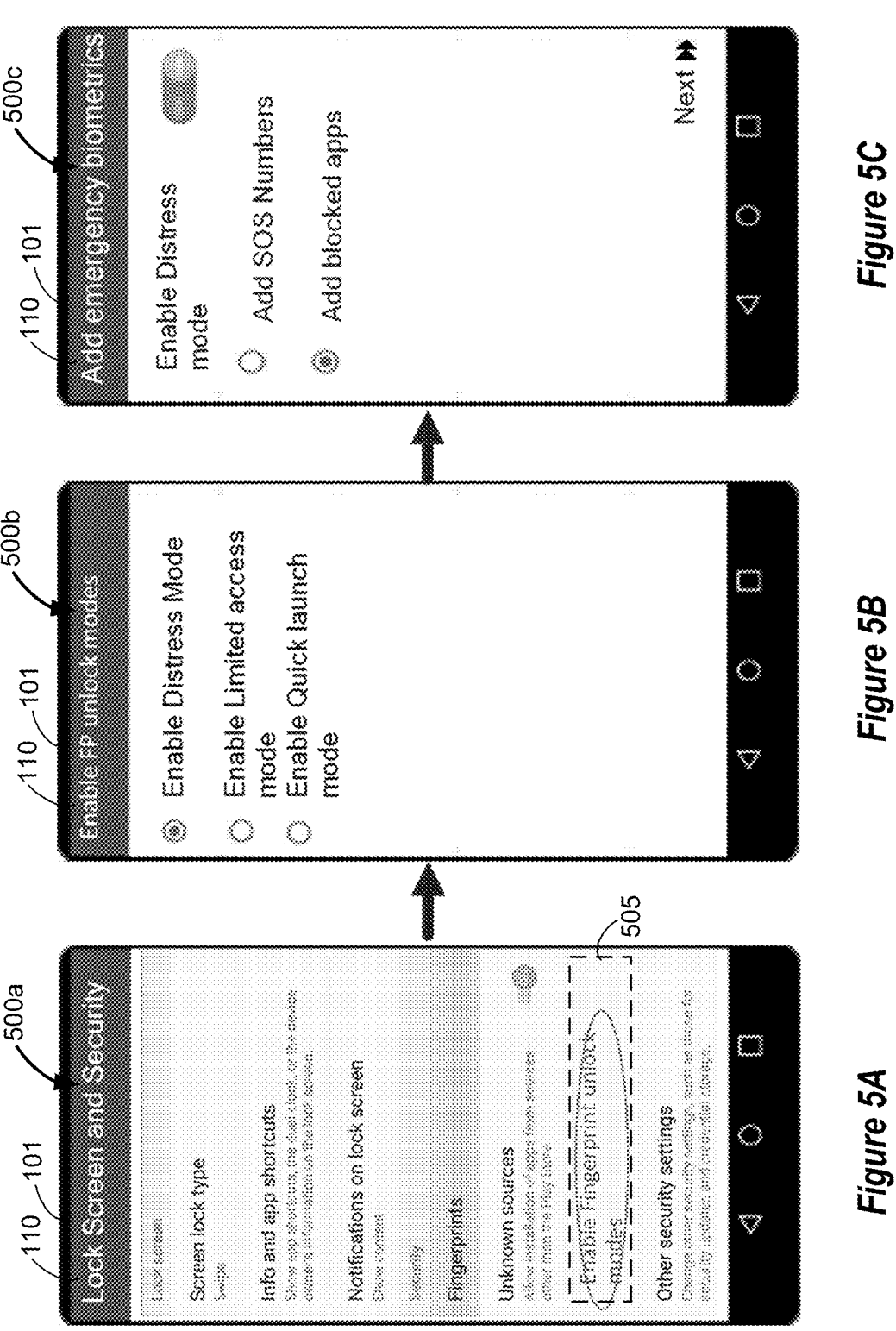
FIGS. 5A, 5B, 5C, 5D, 5E and 5F show examples of graphical user interfaces (GUIs) for establishing device operational modes and corresponding authentication modes.

FIG. 5A shows an example of a GUI 500*a* for initiating a process of establishing device operational modes and corresponding authentication modes. In this example, the GUI 500*a* is a "Lock Screen and Security" GUI, which allows a user to specify details of what will be displayed on the apparatus 101 when the apparatus 101 is locked and to specify details of security features. In this example, a user (such as a device owner or another authorized device user) may interact with "Enable Fingerprint Unlock Modes" area 505 of GUI 500*a* to initiate a process of establishing device operational modes and corresponding authentication modes for the apparatus 101.

FIG. 5B shows an example of a GUI 500*b* for selecting a device operational mode from among a plurality of device operational modes. In this example, a user may interact with (in this example, by touching the circle displayed adjacent the corresponding text) to enable one or three device operational modes. In this example, the user has chosen to enable a distress mode. Accordingly, in this example subsequent GUIs will be presented in order to establish details of the distress mode, as well as details of a corresponding authentication mode.

FIG. 5C shows an example of a GUI 500*c* that may be presented after a user has selected a distress mode by interacting with the GUI 500*b*. According to this example, the GUI 500*c* includes an "Enable Distress Mode" area which a user may toggle on or off in order to indicate whether a distress mode will be added. In some alternative examples, the GUI 500*c* may not include an "Enable Distress Mode" area. In some such examples, this feature may be automatically enabled when a user selects a distress mode by interacting with the GUI 500*b*.

According to this example, the user may select an "Add SOS Numbers" option or an "Add Blocked Apps" option, both of which will cause one or more additional GUIs to be presented in order to allow a user to specify further details. In this example, the "Add Blocked Apps" option has been selected. In some examples, the GUI 500*c* (or a similar GUI) may allow a user to select an "Add Blocked Data" option, which will cause one or more additional GUIs to be presented in order to allow a user to specify further details regarding data to be blocked when a distress mode has been enabled.

Figures 5D, 5E, 5F:
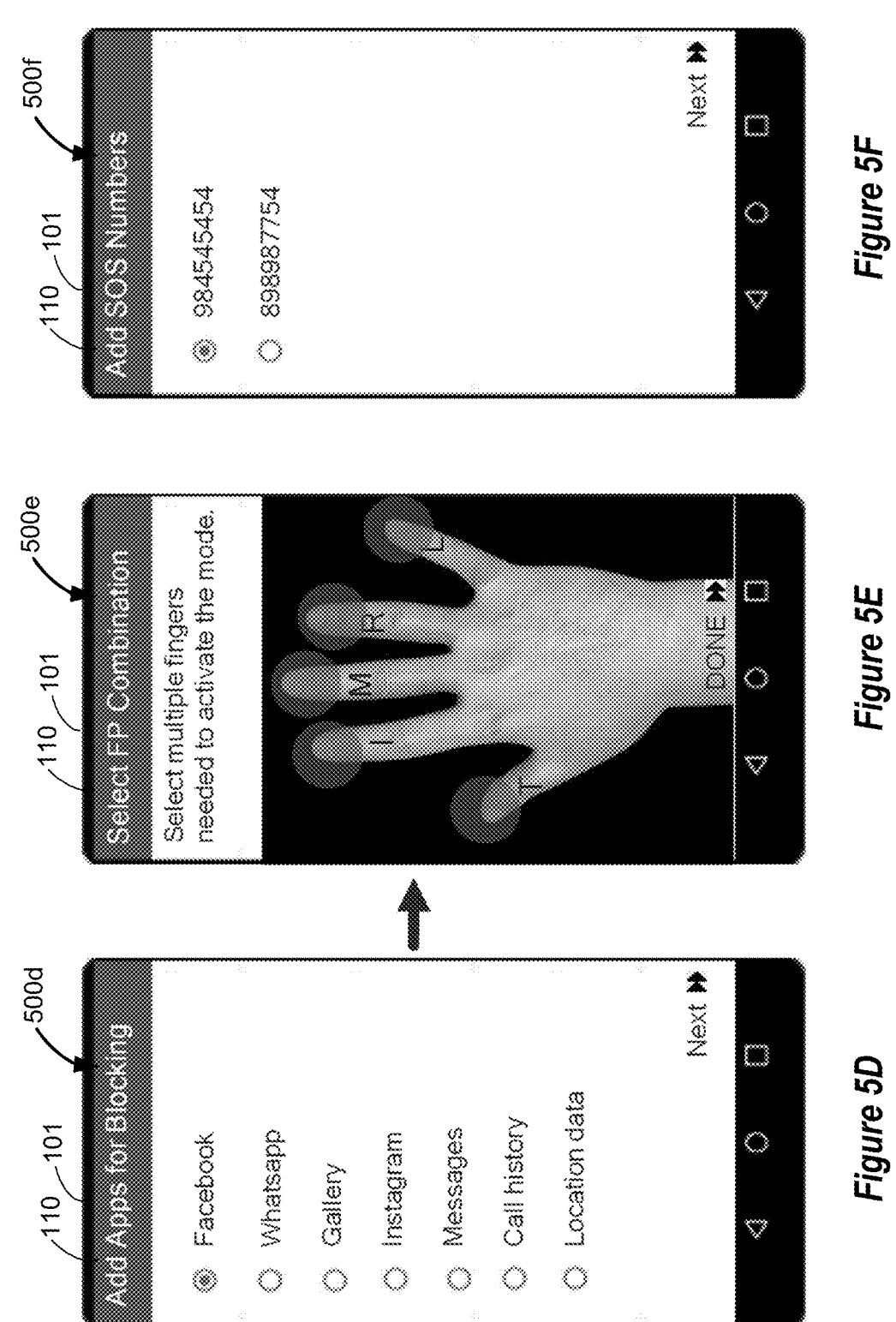

FIG. 5D shows an example of a GUI 500*d* that may be presented after a user has selected the "Add Blocked Apps" option of the GUI 500*c*. According to this example, the GUI 500*d* includes a listing of software applications or "apps" to which a user may choose to block access when the apparatus 101 is operating in a distress mode. In this example, some of the apps (here, Facebook™, WhatsApp™ and Instagram™) are selectable by name, whereas other applications are selectable by the function of the application. Accordingly, a user may be able to select some types of data (which in this example include call history and location data) to be blocked according to the corresponding function of the application. In some alternative examples, the GUI 500*d* (or another GUI) may allow a user to select additional apps, for example any application that would otherwise be enabled on the apparatus 101.

FIG. 5E shows an example of a GUI 500*e* that may be presented responsive to a user's interaction with the "Next" area of the GUI 500*d*. According to this example, a user may select two or more digits of the user's right hand to be used in a fingerprint authentication mode that will correspond with, and cause to be initiated, the distress mode. In this example, the user may select a digit by touching a circle corresponding to, and displayed with, the digit. In some alternative examples, the GUI 500*e* (or another GUI) will enable a user to select one or more digits from the right hand or the left hand. In this example, fingerprint image data has already been obtained from all digits displayed in the GUI 500*e*. According to some examples, if a user selects one or more digits from the GUI 500*e* for which fingerprint image data has not already been obtained, one or more additional GUIs will be presented in order to allow fingerprint image data to be obtained from the selected digit(s).

FIG. 5F shows an example of a GUI 500*f* that may be presented responsive to a user's selection of the "Add SOS Numbers" area of the GUI 500*c*. According to this example, the GUI 500*f* allows the user to select one or more frequently-used telephone numbers to which SOS data will be sent (e.g., texted) if the user initiates the distress mode. In some examples, the GUI 500*f* (or another GUI) may allow the user to input one or more telephone numbers or other types of contact information. According to some examples, the GUI 500*f* (or another GUI) may allow the user to indicate a specific message that will be included in the SOS data. In some examples, the GUI 500*f* (or another GUI) may allow the user to select whether health information, such as health information obtained by the health information system 116 of FIG. 1, will be transmitted as part of the SOS data.

FIGS. 6A, 6B, 6C and 6D show additional examples of GUIs for establishing device operational modes and corresponding authentication modes. The numbers, types and arrangements of elements shown in the figures provided herein, including but not limited to those of FIGS. 6A-6D, are merely examples. Other examples may include different elements, different arrangements of elements, or combinations thereof. In these examples, the apparatus 101 shown in FIGS. 6A-6D is an instance of the apparatus 101 of FIG. 1. According to these examples, the control system 106 (not shown) is controlling the display system 110 to present the GUIs 600*a*-600*d*.

FIG. 6A shows an example in which a user has selected the "Enable quick launch mode" option of GUI 500*b*. FIG. 6B shows an example of a GUI 600*b* that may be presented after a user has selected a quick launch mode by interacting with the GUI 500*b*. According to this example, the GUI 600*b* includes an "Enable Quick Launch Mode" area which a user may toggle on or off in order to indicate whether a quick launch mode will be added. In some alternative examples, the GUI 600*b* may not include an "Enable Quick Launch Mode" area. In some such examples, this feature may be automatically enabled when a user selects a quick launch mode by interacting with the GUI 500*b*. According to this example, the user has chosen a "Select Apps to Launch" option from the GUI 600*b*, which will cause one or more additional GUIs to be presented in order to allow a user to specify one or more software applications to be automatically launched when the user initiates the quick launch mode according to the corresponding authentication mode. In some alternative examples, a user may select an automatic communication option from the GUI 600*b*, or from another GUI, which will cause one or more additional GUIs to be presented in order to allow a user to specify contact information for a person who will be automatically called, texted, etc., when the quick launch mode is implemented responsive to a successful authentication via the corresponding authentication mode.

FIG. 6C shows an example of a GUI 600*c* that may be presented after a user has selected the "Select Apps to Launch" option from the GUI 600*b*. According to this example, the GUI 600*c* includes a listing of specific software applications or "apps," as well as categories of apps, that may automatically be enabled when the quick launch mode is implemented responsive to a successful authentication via the corresponding authentication mode. In some alternative examples, the GUI 500*d* (or another GUI) may allow a user to select additional apps, or categories of apps.

FIG. 6D shows the GUI 500*e*, which is an example of a GUI that may be presented responsive to a user's interaction with the "Next" area of the GUI 600*c*. According to this example, a user may select two or more digits of the user's right hand to be used in a fingerprint authentication mode that will correspond with the quick launch mode and which will cause the quick launch mode to be initiated, responsive to a successful authentication via the fingerprint authentication mode. In this example, the user may select a digit by touching a circle corresponding to, and displayed with, the digit. In some alternative examples, the GUI 500*e* (or another GUI) will enable a user to select one or more digits from the right hand or the left hand. In this example, fingerprint image data has already been obtained from all digits displayed in the GUI 500*e*. According to some examples, if a user selects one or more digits from the GUI 500*e* for which fingerprint image data has not already been obtained, one or more additional GUIs will be presented in order to allow fingerprint image data to be obtained from the selected digit(s).

FIG. 7 is a flow diagram that presents examples of operations according to some disclosed methods. The blocks of FIG. 7 may, for example, be performed by the apparatus 101 of FIG. 1, by the apparatus 101 of FIG. 2, or by a similar apparatus. For example, in some instances method 700 may be performed, at least in part, by the control system 106 of FIG. 1. As with other methods disclosed herein, the methods outlined in FIG. 7 may include more or fewer blocks than indicated. Moreover, the blocks of methods disclosed herein are not necessarily performed in the order indicated. In some implementations, one or more blocks may be performed concurrently.

According to this example, method 700 involves establishing a device operational mode corresponding with an authentication mode. In some examples, the device may be a mobile device, such as a cellular telephone. However, in other examples, the device may be another type of device, such as a tablet, a laptop, an automobile or component thereof, a wearable device, etc.

In this example, block 705 involves providing one or more prompts to select the device operational mode. According to some examples, block 705 may involve providing a prompt like that shown in FIG. 5B, or a similar prompt. According to some such examples, block 705 may involve, or may be performed responsive to, receipt of user input regarding a previous prompt. For example, the GUI 500*b* of FIG. 5B may be presented responsive to a previous selection of enabling specific "unlock modes," for example as shown in the example of FIG. 5A and described herein. In some examples, block 705 may involve providing one or more audio prompts.

According to this example, block 710 involves receiving input corresponding to a selected device operational mode. In some examples, block 710 may involve receiving input via the GUI 500*b*, or via a similar GUI, corresponding to a selected device operational mode. According to some examples, block 710 may involve receiving input via another type of user input, such as a voice command, corresponding to a selected device operational mode.

In this example, block 715 involves providing one or more prompts to select functionality corresponding with the device operational mode. In some examples, the functionality available for selection may be based, at least in part, on the input received in block 710. For example, if block 710 involves receiving input via the GUI 500*b*, or via a similar GUI, and a distress mode is selected via the GUI 500*b*, block 715 may involve presenting at least the GUI 500*c*, or a similar GUI, and in some examples also may involve presenting one or more additional GUIs (such as the GUIs 500*d* and 500*f,* or similar GUIs) to allow a user to specify further details. However, if block 710 involves receiving input via the GUI 500*b*, or via a similar GUI, and a quick launch mode is selected via the GUI 500*b*, block 715 may involve presenting at least the GUI 600*b*, or a similar GUI, and in some examples also may involve presenting one or more additional GUIs (such as the GUI 600*c*, or a similar GUI) to allow a user to specify further details.

According to this example, block 720 involves receiving input corresponding to selected functionality corresponding with the device operational mode. As noted above, in some examples the functionality available for selection may be based, at least in part, on the selected device operational mode (the input received in block 710). Therefore, the input received in block 720 also may be based, at least in part, on the selected device operational mode. For example, if a distress mode has been selected in block 710, block 720 may involve receiving input regarding at least one type of device functionality for which access should be blocked, input regarding at least one type of data to which access should be blocked, SOS contact information, the type of SOS communication that will be sent (for example, a text message, a WhatsApp message, a Teams chat message, etc.), what specific SOS data will be conveyed in the SOS communication (for example, whether the SOS data will include health condition data, such as health condition data from the health evaluation system 114, or whether the SOS data will only include, for example, a message that the user has initiated a distress mode on the apparatus 101), or combinations thereof.

In this example, block 725 involves providing one or more prompts to select the authentication mode. According to this example, block 730 involves receiving input corresponding to a selected authentication mode. According to some examples, block 725 may involve providing one or more prompts to select details regarding a biometric authentication mode and block 730 may involve receiving input regarding the details. For example, block 725 may involve providing one or more prompts to select details regarding a fingerprint-based authentication mode, such as described above with reference to FIGS. 5E and 6D, and block 730 may involve receiving input regarding details of the fingerprint-based authentication mode. Alternatively, or additionally, block 725 may involve providing one or more prompts to select details regarding another type of biometric authentication mode, such a retinal scan-based authentication mode, a face recognition-based authentication mode, a voice recognition-based authentication mode, etc., and block 730 may involve receiving input regarding details of the biometric authentication mode. Alternatively, or additionally, block 725 may involve providing one or more prompts to select details regarding a code-based authentication mode and block 730 may involve receiving input regarding details of the code-based authentication mode.

In this example, block 735 involves associating the selected device operational mode and the selected functionality with the selected authentication mode. In some such examples, block 735 may involve storing, in a memory, information corresponding to the selected device operational mode, the selected functionality and the selected authentication mode in related regions of one or more data structure. In some such examples, the data structure may be similar to one of the data structures that are illustrated in FIGS. 4A-4E, except with additional information regarding the specifics of the authentication mode(s) and the corresponding device operational modes. In some examples, one data structure may include one or more pointers corresponding to information in another data structure. According to some such examples, if a biometric authentication mode has been selected, a selected type of biometric authentication mode may be stored in a first data structure (for example, that the biometric authentication mode corresponds to fingerprint data from specified digits), a second data structure may contain the actual biometric data to be used during a biometric authentication process (for example, features (such as minutiae) that have been extracted from fingerprint image data obtained from the specified digits). In some such examples, the first data structure may include a pointer to corresponding details in the second data structure.

Implementation examples are described in the following numbered clauses:

1. A method of controlling a device operational mode, the method including: receiving an indication of an authentication attempt; determining an authentication mode corresponding with the authentication attempt; and determining a device operational mode corresponding with the authentication mode.

2. The method of clause 1, further including: determining that an authentication process corresponding with the authentication attempt completed successfully; and invoking the device operational mode corresponding with the authentication mode.

3. The method of clause 2, where the device operational mode is a limited access mode and where the limited access mode involves blocking access to at least one type of device functionality or access to at least one type of data.

4. The method of clause 3, where the at least one type of data includes one or more of image data, video data, textual data or alphanumeric data.

5. The method of clause 3 or clause 4, where the at least one type of device functionality includes functionality of one or more software applications.

6. The method of any one of clauses 2-5, where the device operational mode is a distress mode and where the distress mode involves transmitting SOS data to one or more other devices.

7. The method of clause 6, where the distress mode involves blocking access to at least one type of device functionality or access to at least one type of data.

8. The method of any one of clauses 2-7, where the device operational mode is a quick launch mode and where the quick launch mode involves initiating one or more software applications.

9. The method of any one of clauses 1-8, where the authentication mode corresponds with a fingerprint-based authentication mode.

10. The method of clause 9, where the fingerprint-based authentication mode involves fingerprints from more than one digit.

11. The method of clause 10, where the fingerprint-based authentication mode corresponds with a specific combination of fingerprints from more than one digit.

12. The method of any one of clauses 1-11, where receiving the indication of the authentication attempt involves receiving one or more touch indications in a fingerprint sensor area.

13. The method of clause 12, where receiving the indication of the authentication attempt involves receiving touch indications corresponding to two or more digits in the fingerprint sensor area.

14. The method of any one of clauses 1-13, where receiving the indication of the authentication attempt involves receiving, via a user interface system, a code including a plurality of numbers, a plurality of letters, or a combination thereof and where determining the authentication mode involves determining a code-based authentication mode.

15. The method of clause 14, where determining the device operational mode corresponding with the authentication mode involves determining whether the code corresponds with a normal operational mode, a distress mode, a limited access mode or a quick launch mode.

16. An apparatus, including: an interface system; and a control system configured for communication with the interface system and configured to: receive, via the interface system, an indication of an authentication attempt; determine an authentication mode corresponding with the authentication attempt; and determine a device operational mode corresponding with the authentication mode.

17. The apparatus of clause 16, further including an authentication system configured for communication with the control system, the authentication system being further configured to perform one or more types of authentication processes, where, responsive to determining that an authentication process corresponding with the authentication attempt completed successfully, the control system is further configured to implement the device operational mode corresponding with the authentication mode.

18. The apparatus of clause 17, where the device operational mode is a limited access mode and where the limited access mode involves blocking access to at least one type of device functionality or access to at least one type of data.

19. The apparatus of clause 18, where the at least one type of data includes one or more of image data, video data, textual data or alphanumeric data.

20. The apparatus of clause 18 or clause 19, where the at least one type of device functionality includes functionality of one or more software applications.

21. The apparatus of any one of clauses 17-20, where the device operational mode is a distress mode and where the distress mode involves transmitting SOS data to one or more other devices.

22. The apparatus of clause 21, where the distress mode involves blocking access to at least one type of device functionality or access to at least one type of data.

23. The apparatus of any one of clauses 17-22, where the device operational mode is a quick launch mode and where the quick launch mode involves initiating one or more software applications.

24. The apparatus of any one of clauses 16-23, where the authentication mode corresponds with a fingerprint-based authentication mode.

25. The apparatus of clause 24, where the fingerprint-based authentication mode involves fingerprints from more than one digit and where the device operational mode corresponds with a specific combination of fingerprints from more than one digit.

26. The apparatus of any one of clauses 16-25, where receiving the indication of the authentication attempt involves receiving one or more touch indications in a fingerprint sensor area.

27. The apparatus of any one of clauses 16-26, where receiving the indication of the authentication attempt involves receiving, via a user interface system, a code including a plurality of numbers, a plurality of letters, or a combination thereof, where determining the authentication mode involves determining a code-based authentication mode and where determining the device operational mode corresponding with the authentication mode involves determining whether the code corresponds with a normal operational mode, a distress mode, a limited access mode or a quick launch mode.

28. One or more non-transitory media having software stored thereon, the software including instructions for controlling one or more devices to perform a method of establishing a device operational mode corresponding with an authentication mode, the method including: providing one or more prompts to select the device operational mode; receiving input corresponding to a selected device operational mode; providing one or more prompts to select functionality corresponding with the device operational mode; receiving input corresponding to selected functionality corresponding with the device operational mode; providing a one or more prompts to select the authentication mode; receiving input corresponding to a selected authentication mode; and associating the selected device operational mode and the selected functionality with the selected authentication mode.

29. The one or more non-transitory media of clause 28, where associating the selected device operational mode and the selected functionality with the selected authentication mode involves storing data in a memory corresponding to the selected device operational mode, the selected functionality and the selected authentication mode.

30. The one or more non-transitory media of clause 29, where the device operational mode is a limited access mode and where the limited access mode involves blocking access to at least one type of device functionality or access to at least one type of data.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations presented herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order presented or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

What is claimed is:

1. A method of controlling a device operational mode, the method comprising: receiving an indication of an authentication attempt, wherein receiving the indication of the authentication attempt involves receiving touch indications corresponding to two or more digits in a fingerprint sensor area; determining an authentication mode corresponding with the authentication attempt, wherein the authentication mode is a fingerprint-based authentication mode and wherein the fingerprint-based authentication mode corresponds with a plurality of specific combinations of fingerprints from more than one digit; determining a first device operational mode corresponding with the authentication mode, wherein the first device operational mode involves initiating a first software application upon successful authentication via a first combination of fingerprints from more than one digit; determining that an authentication process corresponding with the authentication attempt completed successfully; invoking the first device operational mode corresponding with the authentication mode and wherein the first device operational mode involves initiating a second software application upon successful authentication via a second combination of fingerprints from more than one digit, the first combination of fingerprints being different from the second combination of fingerprints and the first software application being different from the second software application, and wherein the first device operational mode is a quick launch mode and wherein the quick launch mode involves initiating the first software application or the second software application.

2. The method of claim 1, further comprising determining a second device operational mode corresponding with the authentication mode, wherein the second device operational mode is a limited access mode and wherein the limited access mode involves blocking access to at least one type of device functionality or access to at least one type of data.

3. The method of claim 2, wherein the at least one type of data includes one or more of image data, video data, textual data or alphanumeric data.

4. The method of claim 2, wherein the at least one type of device functionality includes functionality of one or more software applications.

5. The method of claim 1, further comprising determining a third device operational mode corresponding with the authentication mode, wherein the third device operational mode is a distress mode and wherein the distress mode involves transmitting SOS data to one or more other devices.

6. The method of claim 5, wherein the distress mode involves blocking access to at least one type of device functionality or access to at least one type of data.

7. The method of claim 1, wherein receiving the indication of the authentication attempt also involves receiving, via a user interface system, a code comprising a plurality of numbers, a plurality of letters, or a combination thereof and wherein determining the authentication mode involves determining a code-based authentication mode.

8. The method of claim 7, wherein determining the device operational mode corresponding with the authentication mode involves determining whether the code corresponds with a normal operational mode, a distress mode, a limited access mode or a quick launch mode.

9. An apparatus, comprising: an interface system; and a control system, implemented using at least one hardware processor, configured for communication with the interface system and configured to: receive, via the interface system, an indication of an authentication attempt, wherein receiving the indication of the authentication attempt involves receiving touch indications corresponding to two or more digits in a fingerprint sensor area;

determine an authentication mode corresponding with the authentication attempt, wherein the authentication mode is a fingerprint-based authentication mode and wherein the fingerprint-based authentication mode corresponds with a plurality of specific combinations of fingerprints from more than one digit; determine a first device operational mode corresponding with the authentication mode, wherein the first device operational mode involves initiating a first software application upon successful authentication via a first combination of fingerprints from more than one digit; and an authentication system, implemented using the at least one hardware processor, configured for communication with the control system, the authentication system being further configured to perform one or more types of authentication processes, wherein, responsive to determining that an authentication process corresponding with the authentication attempt completed successfully, the control system is further configured to implement the device operational mode corresponding with the authentication mode; and wherein the first device operational mode involves initiating a second software application upon successful authentication via a second combination of fingerprints from more than one digit, the first combination of fingerprints being different from the second combination of fingerprints and the first software application being different from the second software application, wherein the first device operational mode is a quick launch mode and wherein the quick launch mode involves initiating the first software application or the second software application.

10. The apparatus of claim 9, wherein the control system is further configured for determining a second device operational mode corresponding with the authentication mode, wherein the second device operational mode is a limited access mode and wherein the limited access mode involves blocking access to at least one type of device functionality or access to at least one type of data.

11. The apparatus of claim 10, wherein the at least one type of data includes one or more of image data, video data, textual data or alphanumeric data.

12. The apparatus of claim 10, wherein the at least one type of device functionality includes functionality of one or more software applications.

13. The apparatus of claim 9, wherein the control system is further configured for determining a third device operational mode corresponding with the authentication mode, wherein the third device operational mode is a distress mode and wherein the distress mode involves transmitting SOS data to one or more other devices.

14. The apparatus of claim 13, wherein the distress mode involves blocking access to at least one type of device functionality or access to at least one type of data.

15. The apparatus of claim 9, wherein receiving the indication of the authentication attempt also involves receiving, via a user interface system, a code comprising a plurality of numbers, a plurality of letters, or a combination thereof, wherein determining the authentication mode involves determining a code-based authentication mode and wherein determining the device operational mode corresponding with the authentication mode involves determining whether the code corresponds with a normal operational mode, a distress mode, a limited access mode or a quick launch mode.

16. One or more non-transitory media having software stored thereon, the software including instructions executed by a hardware processor for controlling a device operational mode, the method comprising:

receiving an indication of an authentication attempt, wherein receiving the indication of the authentication attempt involves receiving touch indications corresponding to two or more digits in a fingerprint sensor area;

determining an authentication mode corresponding with the authentication attempt, wherein the authentication mode is a fingerprint-based authentication mode and wherein the fingerprint-based authentication mode corresponds with a plurality of specific combinations of fingerprints from more than one digit;

determining a first device operational mode corresponding with the authentication mode, wherein the first device operational mode involves initiating a first software application upon successful authentication via a first combination of fingerprints from more than one digit;

determining that an authentication process corresponding with the authentication attempt completed successfully; and invoking the first device operational mode corresponding with the authentication mode;wherein the first device operational mode involves initiating a second software application upon successful authentication via a second combination of fingerprints from more than one digit, the first combination of fingerprints being different from the second combination of fingerprints and the first software application being different from the second software application, and wherein the first device operational mode is a quick launch mode and wherein the quick launch mode involves initiating the first software application or the second software application.

\* \* \* \* \*